(12) United States Patent
Baur

(10) Patent No.: US 10,794,406 B2
(45) Date of Patent: Oct. 6, 2020

(54) ARRANGEMENT AND METHOD FOR CONNECTING A HYDRAULIC CYLINDER

(71) Applicant: BAUER Deep Drilling GmbH, Schrobenhausen (DE)

(72) Inventor: Martin Baur, Ehekirchen (DE)

(73) Assignee: BAUER Deep Drilling GmbH, Schrobenhausen (DE)

( * ) Notice: Subject to any disclaimer, the term of this patent is extended or adjusted under 35 U.S.C. 154(b) by 328 days.

(21) Appl. No.: 15/489,435

(22) Filed: Apr. 17, 2017

(65) Prior Publication Data

US 2017/0328385 A1 Nov. 16, 2017

(30) Foreign Application Priority Data

May 10, 2016 (EP) ..................................... 16168953

(51) Int. Cl.
*F15B 15/14* (2006.01)
*F16B 21/18* (2006.01)

(52) U.S. Cl.
CPC .......... *F15B 15/1457* (2013.01); *F16B 21/18* (2013.01); *Y10T 403/553* (2015.01); *Y10T 403/7075* (2015.01)

(58) Field of Classification Search
CPC ........ F15B 15/1457; F15B 15/16; E02D 7/16; F16B 2/14; F16B 7/02; F16B 7/042; F16B 7/1418; F16B 7/1454; F16B 7/149; F16B 21/16; F16B 21/18; E02F 9/22; E21B 15/00; E04H 12/345; Y10T 403/553; Y10T 403/7018; Y10T 403/7039; Y10T 403/7075

USPC .................................. 403/294, 355, 361, 376
See application file for complete search history.

(56) References Cited

U.S. PATENT DOCUMENTS

| 281,110 | A | * | 7/1883 | Mitchell | ................... | F16B 7/02 |
| | | | | | | 403/355 |
| 2,094,515 | A | * | 9/1937 | Abbe | ...................... | E01H 5/063 |
| | | | | | | 37/232 |
| 2,544,712 | A | * | 3/1951 | Miller | ....................... | F16B 7/02 |
| | | | | | | 403/369 |
| 2,969,243 | A | * | 1/1961 | Drazick | .................. | F16B 21/16 |
| | | | | | | 279/76 |
| 3,039,796 | A | * | 6/1962 | Lawman | ................... | F16B 7/02 |
| | | | | | | 285/343 |
| 3,168,014 | A | * | 2/1965 | Wilfred Aslan | ........ | F15B 15/02 |
| | | | | | | 248/357 |

(Continued)

FOREIGN PATENT DOCUMENTS

DE 200 11 371 U1 9/2000
DE 202007012813 U1 * 11/2007 ............ F16B 7/1418

(Continued)

OTHER PUBLICATIONS

English Language Translation of SU570725A. Translation received on Aug. 30, 2019. (Year: 2019).*

(Continued)

*Primary Examiner* — Josh Skroupa
(74) *Attorney, Agent, or Firm* — Studebaker & Brackett PC

(57) ABSTRACT

Connecting arrangement for a hydraulic cylinder having a cylinder housing and an extendable piston rod, at the free end of which a linkage lug for connection to a construction component is arranged, characterized in that the linkage lug is connected to the piston rod via a plug connection.

14 Claims, 3 Drawing Sheets

(56) References Cited

U.S. PATENT DOCUMENTS

Figure 1:
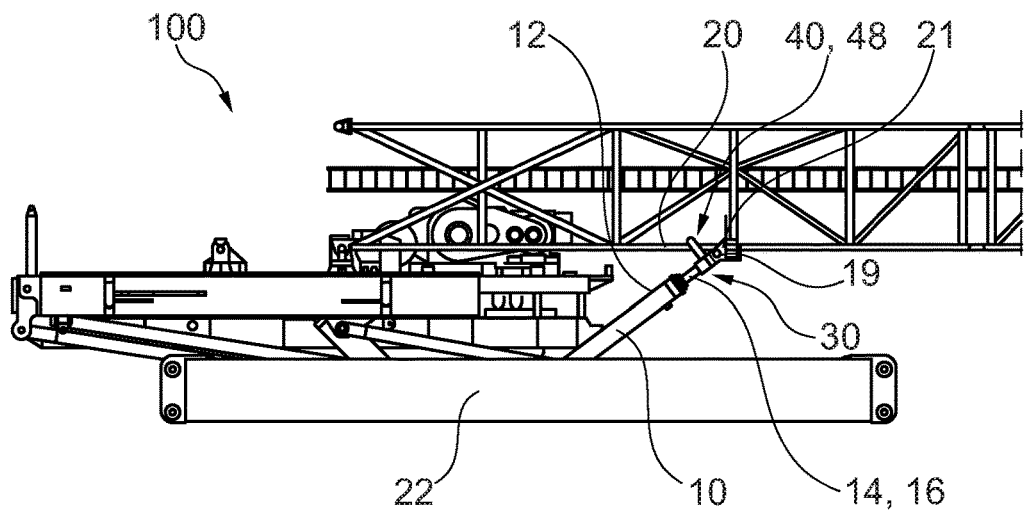

| | | | | | |
|---|---|---|---|---|---|
| 3,730,369 | A | * | 5/1973 | Keene | B66F 9/082 403/123 |
| 3,788,259 | A | * | 1/1974 | Colin | B63B 21/56 114/249 |
| 3,837,316 | A | * | 9/1974 | Stratienko | B63B 35/70 114/249 |
| 3,949,699 | A | * | 4/1976 | Heese | B63B 21/56 114/249 |
| 4,042,306 | A | * | 8/1977 | Murray | F16B 7/182 403/118 |
| 4,071,091 | A | * | 1/1978 | Morris | E02F 3/765 172/797 |
| 4,080,921 | A | * | 3/1978 | Freitag | B60D 1/00 114/249 |
| 4,088,008 | A | * | 5/1978 | Whatling | B21D 41/02 279/76 |
| 4,155,433 | A | * | 5/1979 | Porter | B60N 2/231 188/300 |
| 4,352,596 | A | * | 10/1982 | Hammett | A62C 3/02 166/364 |
| 4,476,912 | A | * | 10/1984 | Harvill | B22D 17/04 164/113 |
| 4,497,092 | A | * | 2/1985 | Hoshino | F16B 7/1418 24/271 |
| 4,577,732 | A | * | 3/1986 | Gottling | F16B 7/02 188/265 |
| 5,222,580 | A | * | 6/1993 | Wang | A63B 21/0083 188/321.11 |
| 5,312,199 | A | * | 5/1994 | Smith, Jr. | F16C 11/00 403/119 |
| 5,353,918 | A | * | 10/1994 | Foster | B65G 25/065 198/750.5 |
| 5,934,151 | A | * | 8/1999 | Carr | G05G 1/30 403/12 |
| 6,142,699 | A | * | 11/2000 | Pao | F16B 7/1454 403/109.5 |
| 6,322,284 | B1 | * | 11/2001 | Bonardo | B60K 23/02 403/348 |
| 6,655,468 | B2 | * | 12/2003 | Casali | A01B 59/004 172/439 |
| 6,979,013 | B2 | * | 12/2005 | Chen | B62K 15/008 280/278 |
| 7,188,563 | B2 | * | 3/2007 | Liebig | F16C 11/0623 403/141 |
| 7,490,813 | B1 | * | 2/2009 | Weddle | A62B 3/005 248/354.1 |
| 7,823,651 | B2 | * | 11/2010 | Olson | A01B 61/046 172/260.5 |
| 8,025,455 | B2 | * | 9/2011 | Huang | F16B 7/1418 280/287 |
| 8,047,152 | B2 | * | 11/2011 | Gai | B63B 1/22 114/285 |
| 8,186,900 | B2 | * | 5/2012 | Riley | F04B 53/147 403/31 |
| 8,262,312 | B2 | * | 9/2012 | Laisement et al. | F16B 7/042 403/361 |
| 8,378,241 | B1 | * | 2/2013 | Cuppett | H01R 13/639 200/48 R |
| 8,505,435 | B2 | * | 8/2013 | Mallmann | F16B 21/18 91/369.3 |
| 8,522,412 | B1 | * | 9/2013 | Walker | B25B 27/026 254/133 R |
| 8,801,318 | B2 | * | 8/2014 | Knoble | F16C 11/0614 384/145 |
| 9,416,805 | B2 | * | 8/2016 | Cascolan | F16B 7/042 |
| 9,695,863 | B2 | * | 7/2017 | Moule | F16B 21/18 |
| 2002/0172548 | A1 | * | 11/2002 | Chang | F16B 7/149 403/305 |
| 2002/0189828 | A1 | * | 12/2002 | Casali | A01B 59/004 172/439 |
| 2005/0062256 | A1 | * | 3/2005 | Chen | B62K 15/008 280/287 |
| 2006/0096452 | A1 | * | 5/2006 | Liebig | F16C 11/0623 92/187 |
| 2009/0016808 | A1 | * | 1/2009 | Knoble | F16C 11/0614 403/61 |
| 2009/0236105 | A1 | * | 9/2009 | Olson | A01B 61/046 172/1 |
| 2009/0277369 | A1 | * | 11/2009 | Gai | B63B 1/22 114/286 |
| 2010/0071426 | A1 | * | 3/2010 | Bingham, Jr. | F16B 7/1454 70/224 |
| 2011/0121523 | A1 | * | 5/2011 | Erickson | F16B 7/042 279/76 |
| 2013/0111712 | A1 | * | 5/2013 | Lai | F16B 7/1454 24/486 |
| 2018/0014951 | A1 | * | 1/2018 | Toler | A61F 2/76 |

FOREIGN PATENT DOCUMENTS

| | | | | |
|---|---|---|---|---|
| EP | 220992 A | * | 5/1987 | F16D 3/387 |
| EP | 2 540 954 A1 | | 1/2013 | |
| FR | 2858289 A | * | 11/1940 | F16B 21/16 |
| GB | 191003679 A | * | 12/1910 | F16B 7/042 |
| GB | 2494306 A | * | 3/2013 | F16B 7/042 |
| GB | 2529880 A | * | 3/2016 | F16B 7/1454 |
| JP | 2001159407 A | * | 6/2001 | F16B 7/1418 |
| SU | 570725 A | * | 9/1977 | F16B 7/20 |
| WO | WO-0179107 A1 | * | 10/2001 | F16B 21/16 |
| WO | WO-2015044012 A1 | * | 4/2015 | A45B 9/00 |

OTHER PUBLICATIONS

The extended European search report issued by the European Patent Office dated Aug. 1, 2016, which corresponds to EP16 16 8953.

* cited by examiner

ARRANGEMENT AND METHOD FOR CONNECTING A HYDRAULIC CYLINDER

The invention relates to a connecting arrangement for a hydraulic cylinder having a cylinder housing and an extendable piston rod, at the free end of which a linkage lug for connection to a construction component is arranged.

The invention also relates to a method for arranging a hydraulic cylinder on a construction component.

The invention further relates to a hydraulic system with at least one hydraulic cylinder of the above-stated type, and to a working machine.

Hydraulic cylinders are employed for the movement of construction components and for the force transmission to these. The cylinder housing of the hydraulic cylinder can be arranged on a first construction component and the piston rod fixed on a piston of the hydraulic cylinder can be connected to a second construction component. With this arrangement a movement of the piston generated by hydraulic pressure in the cylinder can effect a relative movement of both construction components with respect to each other, in particular a relative movement of the second construction component to a firmly positioned first construction component.

In order to enable, for example, a translation and/or rotation of the second construction component relative to the first construction component a linkage lug arranged on the piston rod can be bolted, i.e. connected by means of a bolt, to a fork head present on the second construction component that is to be moved. The linkage lug, the bolt and the fork head thus form a hinge joint. The cylinder housing can also be connected in such a manner to the first construction component.

Such an arrangement of a hydraulic cylinder for moving a construction component relative to another construction component is known from deep drilling rigs for example. In such drilling rigs a mast has to be set up above a drilling site before a drilling is carried out. To erect the mast on a carrier platform a hydraulic positioning cylinder, a so-called mast erecting cylinder, of the above-mentioned type can be arranged between the carrier platform and the mast. The cylinder housing of the cylinder is arranged in a pivotable manner on the carrier platform and the linkage lug on the piston rod of the cylinder is connected, in particular bolted to the mast. The positioning cylinder provided for erecting the mast can at times also be used for retraction of the mast. In this process, the mast is moved in each case relative to the carrier platform.

Since the mast has to be firmly arranged on the carrier platform for drilling in order to be secured in its working position a remaining and permanent arrangement of the hydraulic positioning cylinder between mast and carrier platform during drilling is basically not required. Moreover, a permanent arrangement has the drawback that free access to the drill mast is restricted accordingly by the positioning cylinder. Another drawback of a permanent cylinder arrangement on the drilling rig is that the positioning cylinder which remains in an extended position during drilling is exposed to external influences, as for example occurring vibrations. Thus, it is of advantage to remove again the positioning cylinder prior to drilling.

In order to retract the positioning cylinder again before the drilling process and after erection of the mast, it is essential to separate the connection between the linkage lug on the piston rod and the mast, in particular a bolted connection and in the case of the bolted connection, to remove the connecting bolt. For this purpose, a workman has to climb into the mast or he must be hoisted up to separate the bolted connection manually. Next, after the drilling process the piston rod has to be connected again to the mast, in particular being re-bolted manually, in order to haul in the mast. During re-bolting, however, problems may arise if the linkage lug is not in parallel alignment to the fork head on the mast. This is especially the case with a telescopically extendable cylinder, in which the individual telescopic rods can twist among each other during the telescoping process. In addition to bolting a correction of this alignment then also has to be carried out manually by the workman at the expense of time-consuming measures which, above all, also ensure his operational safety.

The invention is based on the object to provide a connecting arrangement for a hydraulic cylinder which enables an improved and more flexible connection between two construction components.

Preferred embodiments of the invention are stated in the respective dependent claims.

The connecting arrangement according to the invention for a hydraulic cylinder is characterized in that the linkage lug is connected to the piston rod via a releasable plug connection.

A releasable plug connection is to be understood, in particular, as form-fitting or force-fitting connections, in which connection elements engage with one another. Basically, two connection elements can already establish a firm connection. By preference, however, further connection elements can also be provided that help to realize the form fit.

The linkage lug of a hydraulic cylinder can also be referred to as a joint lug or joint head, in which case it can be formed of an annular or toroidal region for receiving a fastening bolt and a transition region for connecting the annular receiving region to the free end of the piston rod of the hydraulic cylinder.

A basic idea of the invention resides in the fact that a connection of two construction components by a hydraulic cylinder, in particular a double-acting cylinder, is not separated on one of the two connections to the construction components themselves but that the hydraulic cylinder is of two-part design and capable of being plugged together in the region of the free end of the piston rod. This has the advantage that in a region of the cylinder housing and a region of the piston rod the hydraulic cylinder can in each case remain permanently connected to a construction component, in which case the connecting arrangement according to the invention can be plugged together before actuation of the hydraulic cylinder and after actuation of the hydraulic cylinder, when this is no longer needed, the plug connection can be separated again.

When the plug connection is separated the piston rod can be moved into the cylinder housing and the cylinder housing can be pivoted away from its working position into a resting position.

Another basic idea of the invention is to be seen in the fact that a linkage lug is already arranged on a construction component to be moved by means of a hydraulic cylinder and the free end of the piston rod of the hydraulic cylinder does not have to be connected to the construction component itself that is to be moved but can be plugged more easily into the linkage lug already attached thereto. Accordingly, it is also conceivable that several construction components that are to be moved and each have a linkage lug attached can be moved individually with a single positioning cylinder.

Thus, an essential aspect of the invention consists in that the connection between two construction components is established automatically with a positioning cylinder, i.e. without manual intervention, and that after relative movement of one of the two construction components with respect to the other construction component by the positioning cylinder the connection is released again automatically and without manual intervention.

A further aspect of the invention is the separability between the group of components consisting in cylinder housing, piston and piston rod on the one hand and the linkage lug as part of the cylinder on the other hand. It can also be understood as being within the meaning of the invention that the piston rod of the hydraulic cylinder is separable, with the linkage lug being arranged on the separable free end of the piston rod. The piston rod can therefore also be referred to as separable or divisible piston rod.

A particularly preferred embodiment of the invention resides in the fact that to form the plug connection, on the linkage lug a sleeve-shaped receiving part is arranged and on the piston rod a bolt element is arranged which can be plugged in a fitting manner into the sleeve-shaped receiving part. In a plugged-in state a form-fitting connection can be formed between the sleeve-shaped receiving part and the bolt element. The form fit can serve to prevent a lateral movement of the bolt element perpendicularly to a center axis of the piston rod in the receiving part. In addition to the movement, preferably prevented in a direction perpendicular to the piston rod, the movement of the bolt element in the sleeve-shaped receiving part is limited in the direction of extension of the piston rod. Hence, by inserting the bolt element into the sleeve-shaped receiving part and by establishing a form fit in the plugged-in state the plug connection can be brought about. An inner surface of the sleeve-shaped receiving part and an outer surface of the bolt element can engage with each other partially or completely in the plugged-in state. The sleeve-shaped receiving part can also be referred to as female plug element and the bolt element as male plug element.

Basically, the sleeve-shaped receiving part and the bolt element can have matching geometries, i.e. corresponding geometries. A preferred embodiment of the invention resides in the fact that the sleeve-shaped receiving part is designed as a funnel-shaped cone and the bolt element as a truncated cone. In this case, the conicity across a region of the outer surface of the truncated cone can correspond to the conicity across a region of the inner surface of the funnel-shaped cone. In the regions of identical conicity the two cones can be in engagement in the plugged-in state. Such a centrical conical connection of the bolt element and the sleeve-shaped receiving part brings the center axes or axes of rotation of the funnel-shaped cone and the truncated cone together in the plugged-in state.

Due to its taper in the direction of extension of the piston rod the truncated cone can be inserted easily into the funnel-shaped cone that widens in a direction opposite to the direction of extension. During insertion of the truncated cone into the funnel-shaped cone a clearance is present which is reduced during insertion until the funnel-shaped cone engages with the truncated cone and establishes an at least partially form-fitting connection without clearance. The funnel-shaped cone and/or the truncated cone can consist of several individual constructional parts, in particular of construction components in corresponding pairs. A pair of a construction component of the funnel-shaped cone and of a construction component of the truncated cone can establish a first form fit that prevents a movement perpendicular to the piston rod. Another such pair can establish a second form fit that prevents a movement of the bolt element in the direction of extension of the piston rod relative to the funnel-shaped cone.

To secure the plug connection against slipping-out in a direction contrary to the direction of extension of the piston and/or to improve the form fit it is advantageous in accordance with a further embodiment variant of the invention that in order to lock the plug connection a locking device is provided and arranged on the sleeve-shaped receiving part. By locking the plug connection the bolt element, when in the plugged-in and locked state, cannot move freely in any direction in the sleeve-shaped receiving part. This can also be referred to as a complete form fit. The locking device itself can in particular produce a form fit that prevents movement of the bolt element relative to the sleeve-shaped receiving part in a direction opposite to the direction of extension of the piston rod. Therefore, the locking device can also be understood as a securing device that prevents the slipping-out of the bolt element in a direction opposite to the direction of extension of the piston rod. Furthermore, through a corresponding form fit the locking device can alternatively or additionally effect a movement of the bolt element with respect to the sleeve-shaped receiving part laterally to or in the direction of extension of the piston rod. Alternatively, the locking device can also be arranged on the bolt element, in particular being integrated in an extendable manner in the latter, and engage with the sleeve-shaped receiving part in the plugged-in and locked state.

Furthermore, monitoring of the connection can take place by mechanical, electric and/or hydraulic sensors or signal transmitters. These sensors can be present on the bolt element and/or on the sleeve-shaped receiving part. The presence of such sensors on the locking device is conceivable too. The sensors provide signals indicating the non-connected state, the connected state and/or the locked and connected state. The signals can be transmitted to a control and evaluation unit.

According to a further development of the invention a particularly secure connecting arrangement results from the fact that on the bolt element and/or the sleeve-shaped receiving part a receiving region is designed and that the locking device has at least one locking bar which is designed to engage with the receiving region. To this end, the locking device can be arranged on the sleeve-shaped receiving part or on the bolt element. In a plugged-in and locked state the receiving region and the at least one locking bar can engage with each other, i.e. they can rest against at least one pair of corresponding surfaces. The at least one locking bar can pass through the bolt element and/or the sleeve-shaped receiving part or rest laterally against one or both. By preference, two locking bars are present on the sleeve-shaped receiving part that engage with the bolt element on opposite sides thereof.

Another advantageous embodiment of the invention results from the fact that on the bolt element a circumferential annular groove is provided as receiving region which is designed between a first and a second region of the bolt element and that the locking device has a two-pronged fork or two locking bars arranged next to each other which are designed to engage with the circumferential annular groove to establish a form-fitting connection. As an alternative to the fork provision can also be made for two parallel arranged individual locking bars that engage on opposite sides of the annular groove. The fork can be arranged in a movable manner on the sleeve-shaped receiving part, thereby enabling it to engage with the circumferential annular groove in the locked state. In addition to the lateral engagement on the bolt element in the annular groove the fork or the locking bars can also engage with or enter laterally into the sleeve-shaped receiving part in order to lock the connecting arrangement. For this purpose, provision also can be made in the sleeve-shaped receiving part for an annular groove lying opposite the circumferential annular groove of the bolt element and for corresponding receiving parts, in particular holes, for the passage through the sleeve-shaped receiving part. The annular groove and/or the fork arms of the fork or the locking bars can have a rectangular or round profile.

According to a further embodiment of the invention it is expedient that on the sleeve-shaped receiving part a positioning cylinder is arranged which is designed to actuate the locking device. The positioning cylinder can be a hydraulic or pneumatic cylinder which is arranged on the sleeve-shaped receiving part. To lock the connecting arrangement a piston rod of the positioning cylinder can be moved in, and in the connected yet unlocked state the said piston rod can be in a retracted position. By arranging the locking device on the piston rod of the positioning cylinder the said device can be brought into engagement with the receiving region through inward movement of the piston rod and can be pulled out again from the receiving region through retraction of the piston rod. By means of the positioning cylinder the locking and unlocking of the connecting arrangement can take place remote-controlled or automatically.

The positioning cylinder can also be understood as a lock cylinder directed transversely to the bolt element. This lock cylinder can slide a locking bolt as part of the locking bar into the sleeve-shaped receiving part.

According to the invention another particularly preferred embodiment resides in the fact that the locking device has a signaling means, with which an optical signal can be generated in an unlocked and/or locked state. The optical signal can be generated by the visibility or invisibility of a region of the locking device or can be actively emitted by the signaling means. The optical signal can be generated, in particular, by a visible region marked with a warning color, especially red or green. Alternatively, light having the wavelength of a warning color, more particularly in a wavelength generating red or green light, can also be emitted. For this purpose a warning light can be provided.

According to a further embodiment of the invention it is expedient that the hydraulic cylinder is arranged in a pivotable manner on a construction component and that the hydraulic cylinder is a double-acting and telescopic cylinder. Due to the pivotable arrangement of the hydraulic cylinder on the construction component this can be pivoted into a working position to extend the piston rod and form the plug connection between linkage lug and piston rod. The extension of the piston rod can be carried out until the bolt element at the end of the piston rod is plugged in a fitting manner into the sleeve-shaped receiving part. The direction of extension for the plug-in fit can be changed by a further pivoting of the hydraulic cylinder and in this way adjusted in an accurately fitting manner for plug-in. For the extension of the piston rod over a distance greater than a single piston stroke of the cylinder the hydraulic cylinder can be a telescopic cylinder. The piston stroke is the maximum distance which the piston inside the cylinder can cover in one direction. Due to the double-acting hydraulic cylinder the piston rod can then also be retracted again.

With regard to the method the previously stated object is achieved in accordance with the invention in that a hydraulic cylinder with a cylinder housing and a piston rod is attached to a first construction component, a linkage lug is attached to a second construction component and the piston rod is extended from the cylinder housing of the hydraulic cylinder, wherein a free end of the piston rod is moved to the linkage lug and releasably connected to the linkage lug by means of a plug connection.

Hence, before movement of the second construction component with the hydraulic cylinder the piston rod of the hydraulic cylinder is extended itself without moving the second construction component, in order to initially establish the plug connection with the linkage lug. Subsequently, in a plugged-in state the second construction component can be moved through further extension or retraction of the hydraulic cylinder.

According to the invention an advantageous embodiment of the method resides in the fact that the plug connection is locked by means of a locking mechanism, wherein a locking bar connected to the linkage lug engages with a receiving region of the free end of the piston rod. The locking mechanism serves for an especially safe movement of the second construction component relative to the first construction component. In particular, the locking mechanism serves to prevent the plug connection from releasing itself.

With regard to the safety of the locking it is especially advantageous that a visual inspection of the locking is effected by means of an optical signaling which indicates a locking and/or non-locking and that when the connection is locked the second construction component is moved relative to the first construction component through extension and/or retraction of the hydraulic cylinder. The locked connection can represent a locked state, in which the second construction component can be moved relative to the first construction component. In this locked state the locking bar engages with the receiving region, and in doing so the locking bar is at least partially no longer visible. A non-engaging part of the locking bar can also be covered by a positioning cylinder that can trigger the locking mechanism or by a cover fixed on this positioning cylinder. The locking bar can be partially or completely in a signal color that renders the free locking bar in its unlocked state clearly recognizable and rendering the locking bar not visible in the locked and covered state. Basically, it is also conceivable that the locked state is indicated, for example in that the locking bar reaches through the bolt element and/or a sleeve-shaped receiving part on the linkage lug and in that as a result of this reaching-through an end of the locking bar becomes visible opposite the positioning cylinder.

According to a further embodiment of the invention it is expedient that after relative movement of the second construction component into a working position the connecting arrangement is released again and the linkage lug remains on the second construction component. After the connection has been released the piston rod can be retracted again and the hydraulic cylinder can be pivoted into a resting position. In this resting position works on or by the second construction component are not disturbed by the pivoted hydraulic cylinder.

Figure 2:
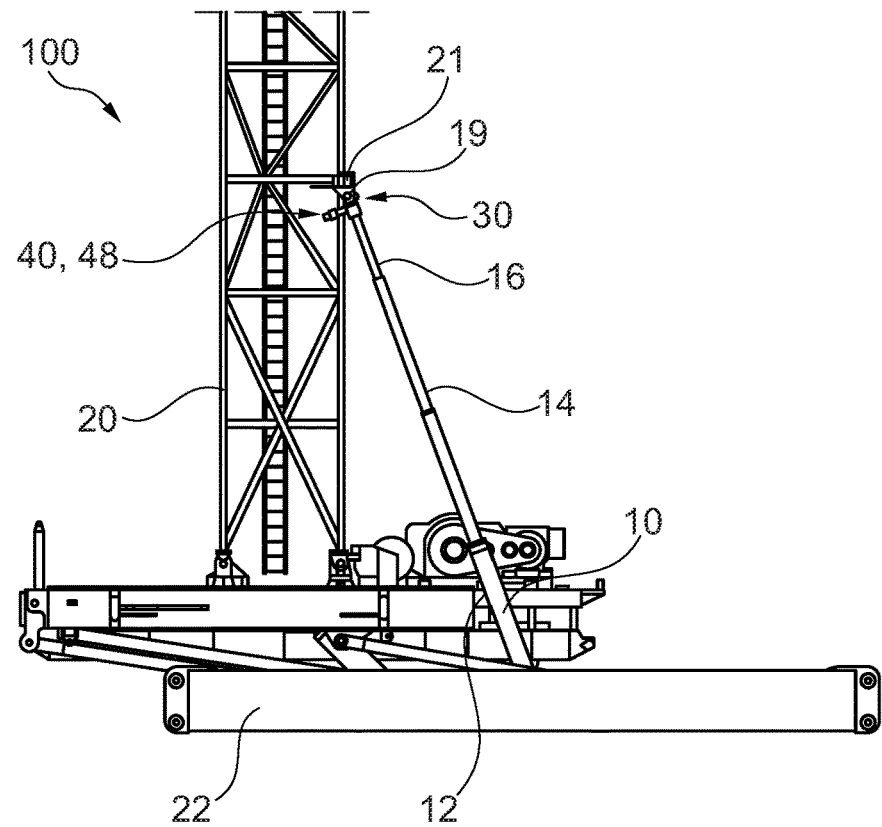
Figure 3A:
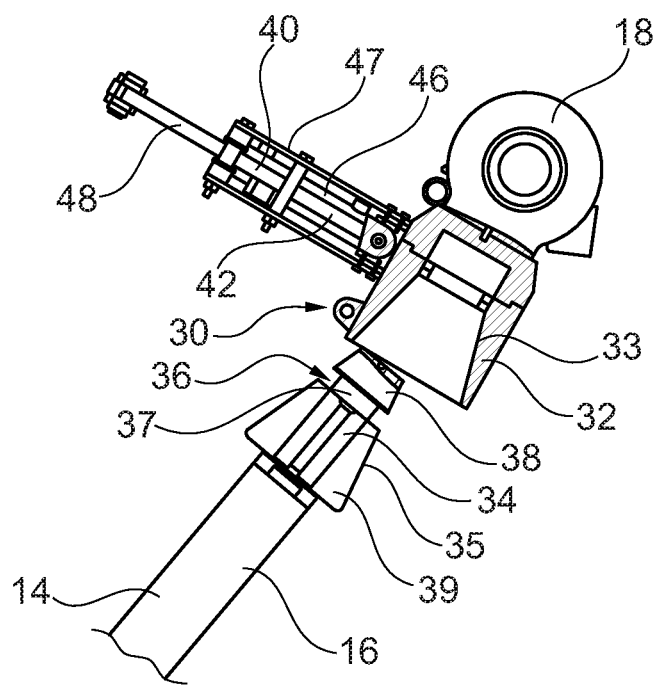
Figure 3B:
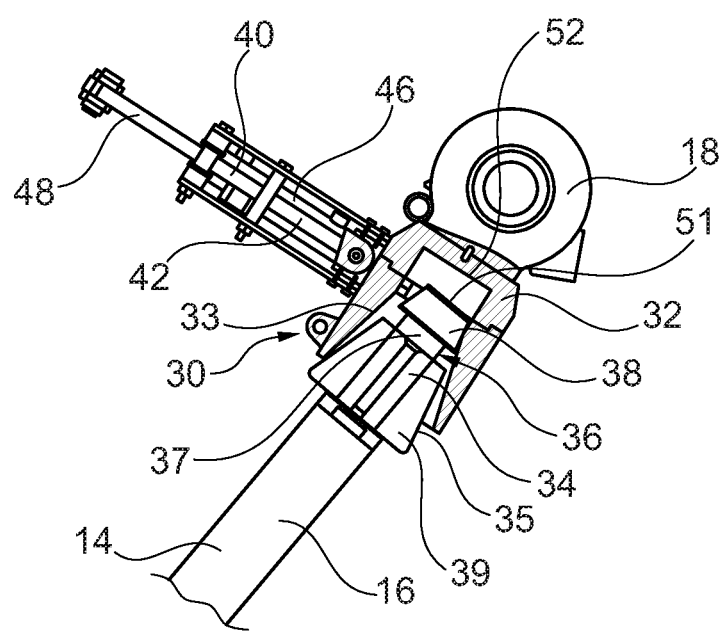
Figure 4:
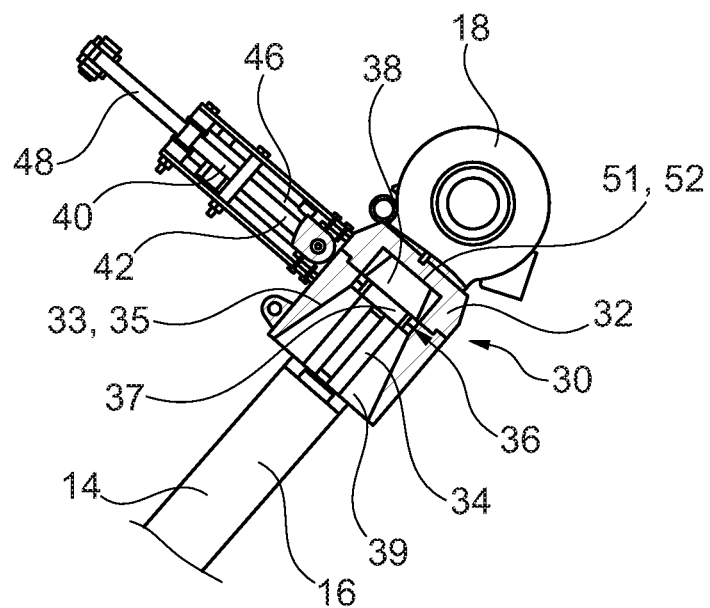
Figure 5A:
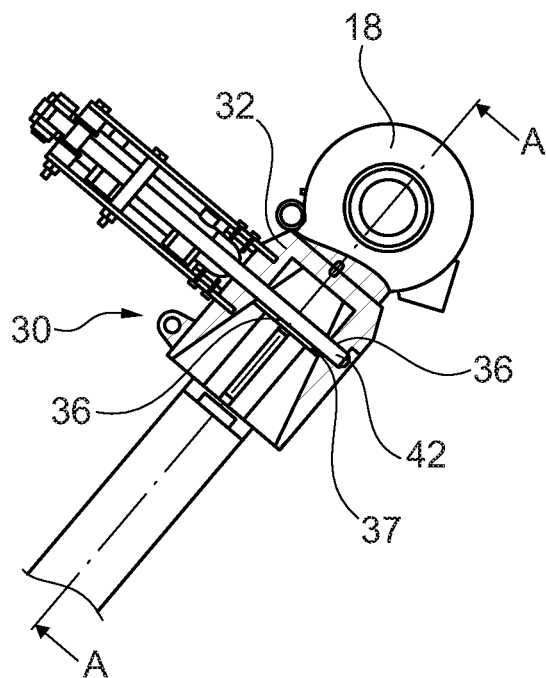
Figure 5B:
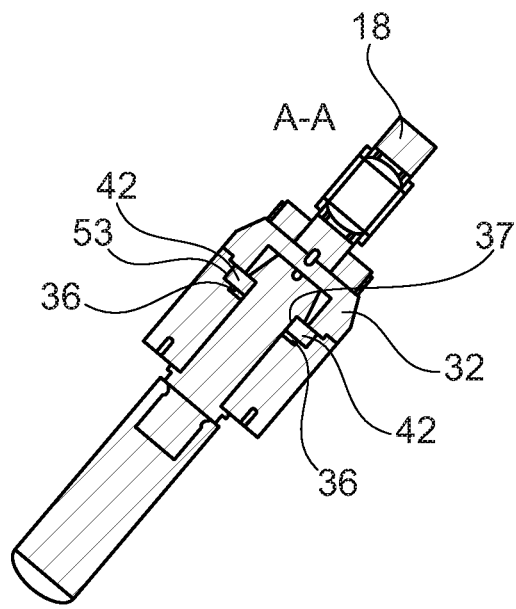

In the following the invention is explained further by way of a preferred embodiment illustrated schematically in the accompanying drawings, wherein show:

FIG. 1: a side view of a connecting arrangement according to the invention for a hydraulic cylinder on a deep drilling rig with the mast folded in;

FIG. 2: a side view of the deep drilling rig of FIG. 1 with the mast erected;

FIG. 3a: a side view of the connecting arrangement according to the invention for a hydraulic cylinder in an unplugged state;

FIG. 3b: a side view of the connecting arrangement according to the invention for a hydraulic cylinder in an unplugged state with a bolt element partially inserted into a sleeve-shaped receiving part;

FIG. 4: the connecting arrangement according to the invention for a hydraulic cylinder in the plugged-in state;

FIG. 5a: a side view of the connecting arrangement according to the invention for a hydraulic cylinder in the plugged-in and locked state;

FIG. 5b: a view taken along line A-A of FIG. 5a.

An exemplary embodiment of the connecting arrangement according to the invention for a hydraulic cylinder 10 is explained in the following in conjunction with FIGS. 1 to 5b. FIGS. 1 and 2 show the hydraulic cylinder 10 on a deep drilling rig 100 and FIGS. 3a to 5b show the connecting arrangement 30.

In FIGS. 1 and 2 the hydraulic cylinder 10 is arranged between a carrier platform 22 of the deep drilling rig 100 and a mast 20 of the deep drilling rig 100. The cylinder housing 12 of the hydraulic cylinder 10 is arranged in a pivotable manner at one end on the carrier platform 22. A piston rod 14 is linked at its free end 16 via a linkage lug 18 to the mast 20. Via the linkage lug 18 the piston rod 14 and the hydraulic cylinder 10 are also arranged in a pivotable manner on the mast. Both pivotable linkages of the hydraulic cylinder 10 to the mast 20 and the carrier platform 22 each form a hinge joint, in which case the hinge joint on the carrier platform 22 is not shown in FIGS. 1 and 2 and the hinge joint on the mast 20 is furthermore designed by a fork head 21 and a bolt 19. The hinge joint on the carrier platform 22 can also be designed in such a manner.

The difference between FIG. 1 and FIG. 2 is that the telescopic piston rod 14 of the hydraulic cylinder 10 is retracted in FIG. 1 and the mast 20 is arranged in a horizontal transport position on the carrier platform 22 whereas the piston rod 14 in FIG. 2 is extended and the mast 20 is located in an erected vertical position on the carrier platform 22 in the working position. In this embodiment the hydraulic cylinder 10 is double-acting and the piston rod 14 is telescopic and has several individual telescopic sections, with the free end 16 being located at the end of the internal rod section. The free end 16 of the piston rod 14 is connected via a releasable plug connection 30 to the linkage lug 18 which is bolted by the bolt 19 to the fork head 21. In the region of the plug connection 30 a locking device 40 with a locking mechanism and a signaling means 48 is arranged that triggers a signaling.

FIG. 3a shows an exemplary embodiment of the connecting arrangement according to the invention for a hydraulic cylinder 10. Here, the plug connection 30 is in an unplugged state. The illustration serves on the one hand for the detailed depiction of the plug connection and on the other hand it shows the state during extension of the piston rod 14 before connection of the piston rod 14 to the linkage lug 18. At its free end 16 the piston rod 14 has a bolt element 34 which is firmly attached to the free end 16 of the piston rod 14. The bolt element 34 has a first frontal region 38 and a second region 39 arranged between the first region 38 and the free end 16 of the piston rod 14. Both regions 38, 39 are of truncated design, in which case they are separated by a receiving region 36 formed by an annular groove 37. The two regions 38 and 39 jointly form the shape of a truncated cone that is interrupted by the annular groove 37. The regions 38, 39 of the bolt element 34 can be separate construction components, which are welded to each other in particular, or regions of an integrally formed bolt element 34. Likewise, the bolt element 34 can be arranged on the piston rod 14 as a separate construction component or the bolt element 34 can be a region of an integrally formed free end 16 of the piston rod 14.

FIG. 3a shows the linkage lug 18 as an annularly designed torus with a sleeve-shaped receiving part 32 attached to the linkage lug 18.

On the sleeve-shaped receiving part 32 two locking bars 42 are arranged laterally that are connected to the piston rod, not depicted, of the positioning cylinder 46. An outer end of the locking bars 42 is designed as signaling means 48. When the locking bars 42 are moved out the signaling means 48 is visible. Around the positioning cylinder 46 and the locking bars 42 a housing 47 is mounted for protection. In addition to the protective function the housing 47 serves as a cover for the signaling means 48 which is no longer visible when the locking bars are moved in. Hence, in the unlocked state, i.e. when the locking bars 42 are moved out, the signaling means 48 is visible and emits an optical warning signal for an unlocked state. As an alternative to the two locking bars 42 provision can also be made for only one locking bar, in particular also having a fork-shaped end of a fork.

In contrast to FIG. 3a FIG. 3b shows the plug connection 30 in a state shortly before a plugged-in state. In this, the tapered cone 35 of the bolt element 34 rests partially against the funnel-shaped cone 33 of the sleeve-shaped receiving part 32. The cones rest against each other in two places, the first place being on the first region 38 of the bolt element 34 and the second place being on the second region 39 of the bolt element 34. In this state the bolt element 34 is moved partially into the sleeve-shaped receiving part 32 and the center axes of the cones 33, 35 are not parallel.

In FIG. 4 the plug connection 30 between the linkage lug 18 and the piston rod 14 is shown in the plugged-in state. In this, the cones 33, 35 rest against each other and their center axes are arranged parallel to each other. The second region 39 of the bolt element 34 is in engagement with the sleeve-shaped receiving part 32, with the cones 33, 35 corresponding to each other via the second region 39. The first region 38 of the bolt element 34 abuts with the front face 51 of the bolt element 34 on the internal end surface 52 of the sleeve-shaped receiving part 32. Between the first region 38 of the bolt element 34 and the sleeve-shaped receiving part 32 a clearance is present in the plugged-in state. In this region the sleeve-shaped receiving part 32 is not of funnel-shaped conical but of cylindrical design.

FIGS. 5a and 5b shows the connecting arrangement 30 in the plugged-in and locked state. In this, two locking bars 42 engage with the receiving region 36. The receiving region 36 is formed by an annular groove 37 and an annular groove 53 lying opposite this annular groove 37 in the sleeve-shaped receiving part 32. The locking bars 42 also engage with the sleeve-shaped receiving part 32 into receiving holes located opposite the positioning cylinder 46. The signaling means 48 is no longer visible in the locked state since the locking bars 42 are moved into the housing 47 of the positioning cylinder 46.

With these exemplary embodiments shown in the Figures all advantages of the invention are realized. In particular, a connecting arrangement for a hydraulic cylinder is shown that can be plugged in and secured automatically.

The invention claimed is:

1. A hydraulic cylinder configured to be connected to a construction component, the hydraulic cylinder comprising:
   a cylinder housing;
   an extendable piston rod, the piston rod having a free end configured for connection to a linkage lug that is configured for connection to the construction component; and
   a connecting arrangement for connecting the hydraulic cylinder to the construction component, the connecting arrangement including a releasable plug connection configured to connect the linkage lug to the piston rod, wherein
   the plug connection includes:
      a sleeve-shaped receiving part configured to be arranged on the linkage lug, and
      a bolt element configured for connection to the piston rod,
   the bolt element is plugged in a fitting manner into the sleeve-shaped receiving part,
   a locking device configured to lock the plug connection is provided and arranged on the sleeve-shaped receiving part, and
   a positioning cylinder is arranged on the sleeve-shaped receiving part, the positioning cylinder being configured to actuate the locking device.

2. The hydraulic cylinder according to claim 1, wherein
   the sleeve-shaped receiving part is cone-shaped and the bolt element has a truncated cone shape.

3. The hydraulic cylinder according to claim 1, wherein
   the bolt element and/or the sleeve-shaped receiving part includes a receiving region, and
   the locking device has at least one locking bar which is configured to engage with the receiving region.

4. The hydraulic cylinder according to claim 3, wherein
   a circumferential annular groove is provided on the bolt element between a first and a second region of the bolt element as the receiving region, and
   the locking device has a two-pronged fork or two locking bars arranged next to each other which are configured to engage with the circumferential annular groove.

5. The hydraulic cylinder according to claim 1, wherein
   the locking device generates an optical signal in a non-locked and/or in a locked state.

6. A hydraulic system with a hydraulic cylinder according to claim 1.

7. The hydraulic system according to claim 6, wherein
   the hydraulic cylinder is arranged in a pivotable manner on the construction component when connected to the construction component with the connecting arrangement, and
   the hydraulic cylinder is a double-acting and telescopic cylinder.

8. A working machine with a hydraulic system according to claim 6.

9. The working machine of claim 8, wherein the working machine is a drilling rig.

10. The working machine of claim 8, wherein the working machine is a construction machine.

11. A method for connecting a hydraulic cylinder according to claim 1 to a construction component using the connecting arrangement, the method comprising:
    attaching the hydraulic cylinder with the cylinder housing and the piston rod to a first construction component,
    attaching the linkage lug to a second construction component, and
    extending the piston rod from the cylinder housing of the hydraulic cylinder and releasably connecting the free end of the piston rod to the linkage lug using the plug connection.

12. The method according to claim 11, wherein
    the plug connection is locked using a locking mechanism, wherein a locking bar connected to the linkage lug engages with a receiving region of the free end of the piston rod.

13. The method according to claim 12, wherein
    a visual inspection of the locking is effected using an optical signaling, which indicates a locking and/or a non-locking, and
    when the connection is locked, the second construction component is moved relative to the first construction component through extension and/or retraction of the hydraulic cylinder.

14. The method according to claim 13, wherein
    after relative movement of the second construction component into a working position, the connecting arrangement is released and the linkage lug remains on the second construction component.

* * * * *